United States Patent
Hoffman (10) Patent No.: US 10,989,282 B1
(45) Date of Patent: Apr. 27, 2021

(54) CONSTANT FORCE ROBOTIC DRESSPACK

(71) Applicant: Amazon Technologies, Inc., Seattle, WA (US)

(72) Inventor: Brian Stuart Hoffman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 16/045,420

(22) Filed: Jul. 25, 2018

(51) Int. Cl.
| | |
|---|---|
| *F16H 3/02* | (2006.01) |
| *F16H 27/02* | (2006.01) |
| *F16H 29/02* | (2006.01) |
| *F16H 29/20* | (2006.01) |
| *F16H 19/06* | (2006.01) |
| *B25J 9/00* | (2006.01) |

(52) U.S. Cl.
CPC ........ *F16H 19/0672* (2013.01); *B25J 9/0009* (2013.01); *F16H 19/0645* (2013.01)

(58) Field of Classification Search
CPC .............. F16H 19/0672; F16H 19/0645; B25J 19/0025; B25J 9/1045; B25J 9/104
See application file for complete search history.

(56) References Cited

U.S. PATENT DOCUMENTS

| | | | |
|---|---|---|---|
| 7,520,473 B2* | 4/2009 | Karlinger ............... | H02G 11/00 174/68.1 |
| 2014/0033851 A1* | 2/2014 | Hermey ................... | B25J 19/00 74/490.02 |
| 2017/0023154 A1* | 1/2017 | Jaeker .................. | H02G 3/0468 |

* cited by examiner

*Primary Examiner* — Jake Cook
(74) *Attorney, Agent, or Firm* — BakerHostetler (57) ABSTRACT

A cable chain retraction system for a robot has a constant force on the cable chain because of the use of constant force springs cartridges. Spring cartridges may be added or subtracted to adjust the spring force on the cable chain. All components may be pre-installed on a rail, such as a quick release guiderail.

20 Claims, 6 Drawing Sheets

CONSTANT FORCE ROBOTIC DRESSPACK

BACKGROUND

This invention relates to robotics, and more particular to cable management for an industrial robot.

A dresspack generally is cable management system mounted to an industrial robot that keeps power and/or signal cables, pressure and/or vacuum airlines, hydraulic lines, and the like together and out of the way while the arm of the robot is manipulated. Most conventional dresspacks include a cable chain through which cables and hoses (such as vacuum, pneumatic air, or hydraulic fluid, or the like) run. For example, several manufacturers, such as, Igus Inc., Kuka, Fanuc (Leoni), and KabelSchlepp manufacture cable chain, including a cable chain that is flexible in one, two, or three dimensions and popular for industrial robots. As used herein, the term "industrial robot" refers to robot (such as the popular six axis robot having an end effector, a robotic arm itself, a gantry, or other automated mover of an end effector to which electrical cables and/or hoses are attached.

Dresspacks mounted on a robot arm often have a means to take up slack in the sleeve as the arm extends and retracts or is manipulated. For example, several manufacturers, such as those listed above, produce dresspacks having a cable chain that is affixed with cable strain relief at one point on the robot and has an adjacent glide-through ring such that the cable chain forms a loop between the fixed point and the glide ring. Some popular dresspacks have a flexible rod mounted inside the cable chain loop that resists bending to apply a force to the cable chain. Other popular dresspacks include a guidewheel, which the cable chain loops around, that is mounted on rails and extended by a pneumatic shock or cylinder that is compressed as the carriage slides forward. Other dresspacks replace the pneumatic shock with elastic bands.

DETAILED DESCRIPTION OF ILLUSTRATIVE EMBODIMENTS

The prior art devices, such as those having a flexible rod, pneumatic shock or piston, or stretch band, produce a retraction force on the cable chain that is a function of the position of the cable chain and/or guidewheel, and thus not constant. Because the retraction force is not constant, the effect of the weight of the cable chain on the arm and/or end effector is not constant. For industrial robots that are heavy and have high inertia, the varying force of the cable chain may be immaterial. For other industrial robots that repeatedly perform the same motions, such as welding robots, the varying force applied by the cable chain may be unimportant because the dynamics of the robot can be optimized to account for the cable chain forces.

But the non-constant forces from the cable chains can interfere with the effectiveness of robots that are employed to perform non-repetitive tasks or to vary the how the task can be performed, especially where speed, acceleration and deceleration, and/or accurate positioning of the end effector is important, such as robots employed in various ways to handle products and/or boxes in modern fulfillment centers or sort centers.

Further, the non-constant forces at the end effector makes managing the available payload capacity in varying arm orientations difficult, as in practice this leads to droopy cabling when retracted and/or high load 'snap' movements when the cable is fully extended and is pulled over the arm wrist. In some cases, the engineer may simplify a design by assuming worst case, thereby limiting design options.

A constant force cable chain retraction system includes: at least one longitudinally extending guiderail; a carriage adapted for moving longitudinally on the guiderail(s) (such as on linear bearings, bushings, low friction polymer pads, and the like); a guidewheel rotationally mounted on the carriage and adapted to move with the carriage; at least one fixed, rolled-ribbon spring cartridge having a ribbon that is adapted for pulling the carriage toward a retracted position, thereby removing slack from the cable chain during operation of the robot; and a fixed mounting body (preferably a mounting plate) adapted for receiving multiple rolled-ribbon spring cartridges, the at least one rolled-ribbon spring cartridge being affixed to the mounting body. The at least one spring cartridge system maintains an approximately constant retraction force on the carriage regardless of the longitudinal position of the carriage.

Preferably the spring cartridges are in aligned, opposite-hand pairs that have the ribbon tails arranged to affix to a single bracket of the carriage or to a part integral with the carriage. Other configurations or arrangements may be used. The cartridges can be added or removed as desired, and the mounting plate can be replaced with a larger one if additional cartridges are required based on the desired retraction force. The ability to add or remove spring cartridges (and thus obtaining a desired retraction force) such that the system is modular provides flexibility and tuning during installation and setup that is not present in the prior art systems. Further, all the components can be pre-assembled on a quick release guiderail for ease of installation on the robot arm. The rail's fixtures are discrete, which aids in the repeatable positioning of additional components, such as sensors. For example, the quick release guiderail may be similar in structure and function (or conception) to a picatinny rail firearm interface system.

A constant force dresspack for mounting on an industrial robot includes the cable chain retraction system; a flexible cable chain looped around the guidewheel of the retraction system; a fixed cable chain clamp affixing the cable chain thereto; and a fixed cable chain guide adapted for enabling the cable chain to translate therethrough upon longitudinal movement of the carriage. The cable chain retraction system maintains an approximately constant retraction force on the cable chain regardless of the longitudinal position of the carriage.

A method for providing constant-force retraction of a cable chain on a robotic arm, comprising the steps of: clamping the cable chain at a cable chain clamp proximate an arm of the robot and guiding the cable chain via a cable chain guide located proximate the clamp chain clamp;

manipulating the robot arm, thereby moving the cable chain such that the cable chain translates through the cable chain guide; and retracting slack in the cable chain by applying a constant retraction force to a loop of the cable chain formed between the clamp location and the cable chain guide. Preferably, the retracting step includes applying the retraction force by at least one rolled-ribbon spring cartridge that retracts a carriage assembly with which the loop is engaged. The method may include adding or subtracting modular rolled ribbon spring cartridges as needed to adjust the retraction force, and installing the rolled-ribbon spring cartridges, the carriage assembly, and the cable chain via a pre-assembled common rail.

Figure 1:
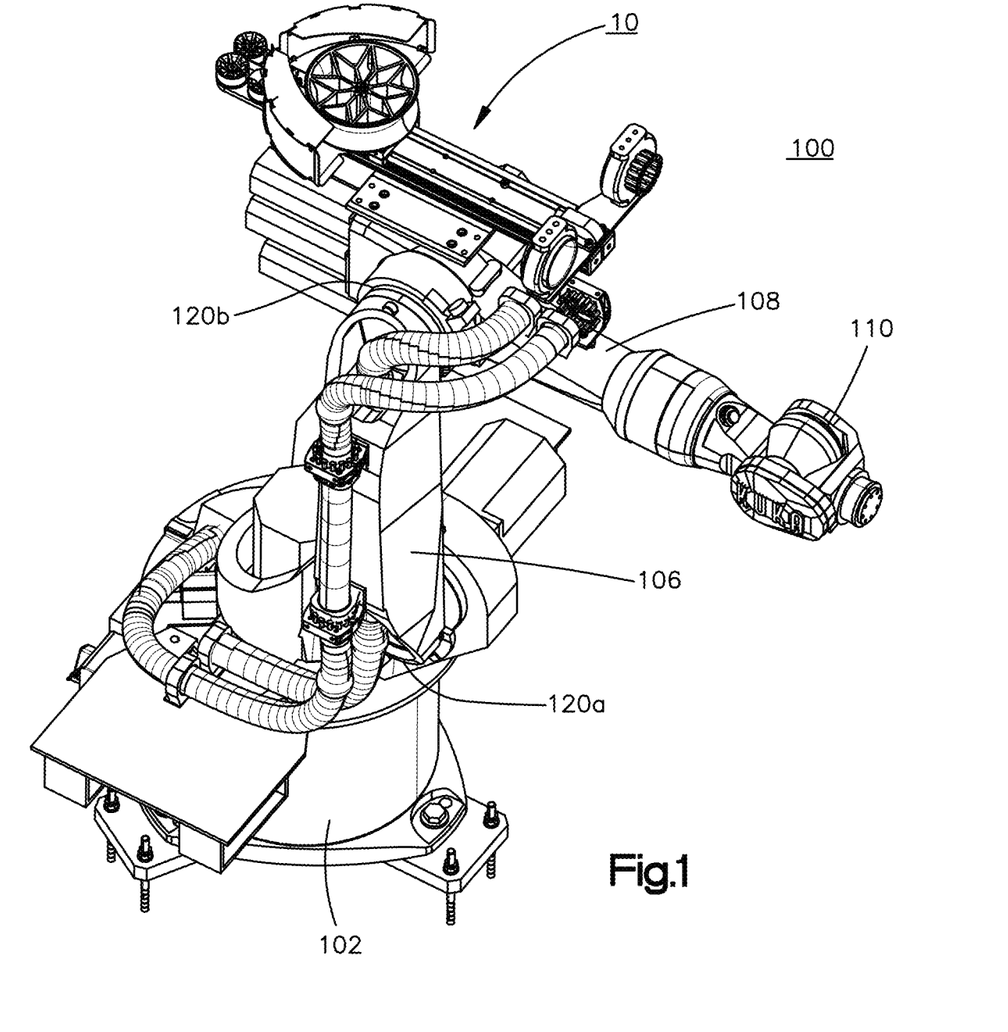
FIG. 1 is an illustration of one type of industrial robot having the cable chain retraction system described herein.
Figure 2:
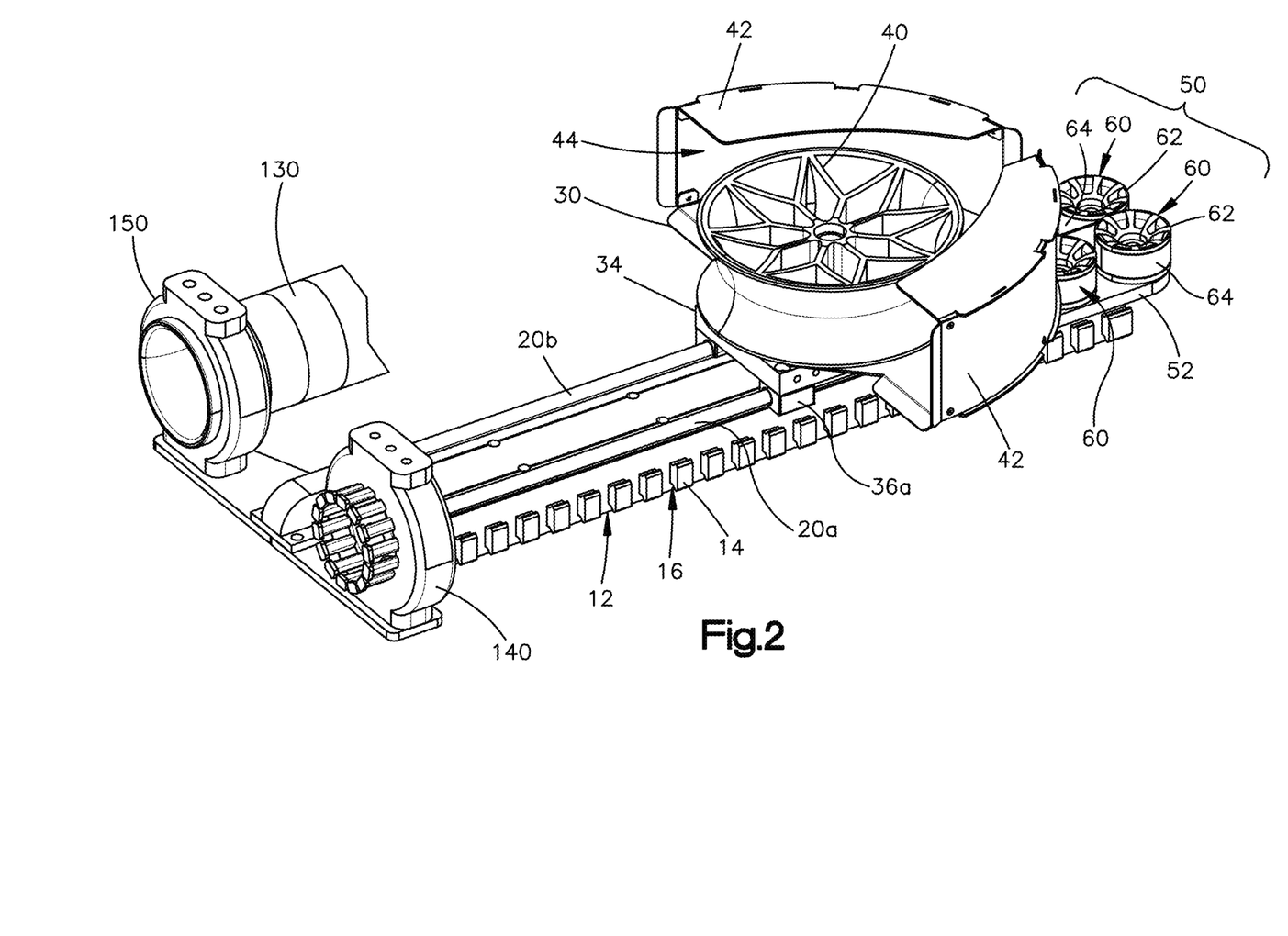
FIG. 2 is a top perspective view of the cable chain retraction system described herein, with the cable chain removed for clarity.
Figure 3:
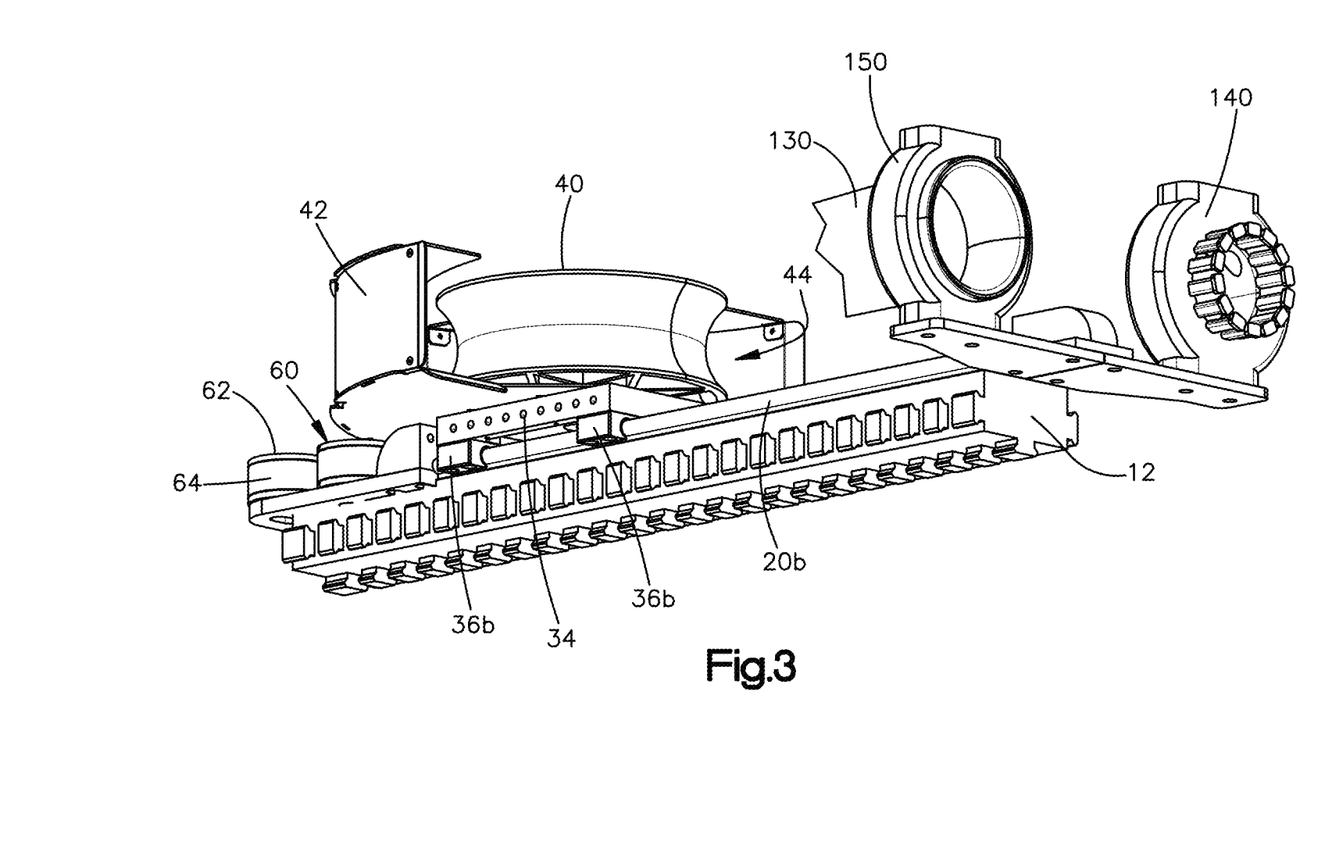
FIG. 3 is bottom perspective view of the cable chain retraction system of FIG. 2.

Referring to FIG. 1, a robot 100 includes a base 102, a link 104 on base 102, a first arm 106, a second arm 108, and an end effector 110. Joints are identified by reference number 120 with an appended letter. Robot 100 includes a cable chain retraction system 10 mounted onto arm 106. The present invention is not limited location of the retraction system on the robot, nor to any type of robot, unless set out in the claims. FIGS. 2 and 3 illustrate a cable chain 130, which in most places is omitted for clarity. Cable path 80 is illustrated schematically in FIG. 5. In the embodiment of the figures, for illustration, cable chain 130 is Igus Triflex™ R or equal. Cable chains from other manufacturers may be employed, and other cable chain configurations (such as cable chains having one, two, or three dimensional flexibility) may be employed without limitation. The term "cable chain" is used herein to refer to any flexible cable management means for holding wires and/or hoses. For example, the cable chain shown in the figures is discrete interlocking and manipulate-able rings, sometimes referred to as energy chain, that enable 2D or 3D flexibility. Other energy chain configurations, such as non-circular energy chains (including oval or oblong cross sections, square or rectangular cross sections, and the like); a simple open or closed flexible hose, and other configurations may be used.

Cable retraction system 10 includes a picatinny rail 12 having dovetails or undercut blocks 14 and slots 16 defined between blocks 14 for enabling ease of attaching fixtures, sensors, and the like, as understood by persons familiar with the structure and function of picatinny rails. Preferably, all other components of system 10 are carried or pre-assembled on rail 12. System 10 includes longitudinal guiderails 20a and 20b and a carriage assembly 30 that moves longitudinally on rails 20a and 20b. Carriage assembly 30 includes a carriage body 34, bearings 36a and 36b, a bracket 38, a rotatable guidewheel 40, and guides 42 that wrap around a rear half of guidewheel 40. Guidewheel 40 includes a curved outboard surface and guides 42 and curved inboard surfaces to define a cable chain path 44 about which cable chain 130 loops. Guides 42 also extend overtop of cable chain path 44. Loop 80 is illustrated schematically with a dashed line in FIG. 5. A configuration employing a loop about a guidewheel has the advantage of making up two units of cable chain for each unit of movement of the guidewheel. Thus, the embodiment in the figures illustrates loop 80 about guidewheel 40. It is also possible for the spring assemblies to be mounted directly to the cable chain (not shown in the figures).

Carriage body 34 is a plate that includes a pair of bearings 36a (fore and aft) mounted onto guiderail 20a and a pair of bearings 36b (fore and aft) mounted onto guiderail 20b. Bearings 36a and 36b may be any type of linear bearing, bushing, polymeric low-friction slider or material, or any other type of interface common for the purpose on enabling a body to slide on rails. Further, the embodiment includes a pair of parallel rails, and the term "rail" encompasses any number (one, two, three or more) supports of any configuration. For example, a single central rail may be used to enable a carriage to move longitudinally. Further, the term "bearing" or "bearing means" encompasses any structure that enables rail to bear the weight of the carriage.

A front end of retraction system 10 includes a cable chain clamp 140 and a cable chain guide 150 that are supported by a wing bracket on picatinny rail 12. Clamp 140 and guide 150 are located on opposing sides of a longitudinal centerline of system 10, and preferably are equidistantly, transversely spaced apart. Clamp 140 and guide 150 may be chosen to work with the particular cable chain employed. For example, if Triflex™ R or equal is used for cable chain 130, a corresponding Triflex™ "Mounting Bracket" or equal may be used for clamp 140 (with strain relief) and corresponding Triflex™ "Glide Through Ring" or equal may be used for guide 150. The clamp and guide are shown with a particular orientation, and also may be reversed from the orientation shown, such as to change the system from a left-hand orientation to a right hand orientation.

Clamp 140 and guide 150 are referred to herein as fixed relative to picatinny rail 12. The term "fixed" encompasses pivoting connection of clamp 140 and/or guide 150. Because guidewheel 40 is on the longitudinal centerline, cable chain 130 can loop through cable chain path 44, and thus cable chain path 44, clamp 140, and guide 150 may be said to define loop 80.

Figure 5:
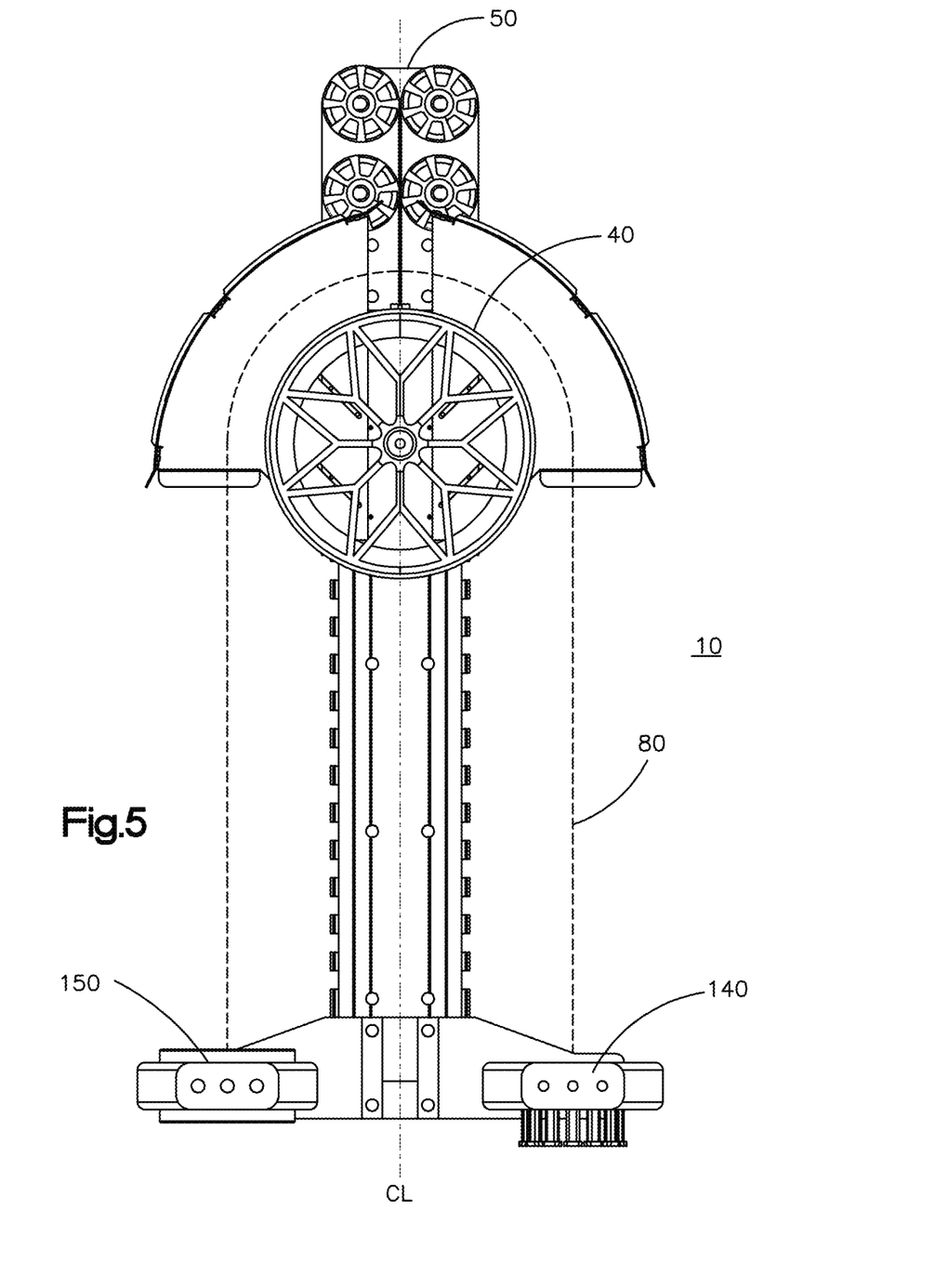
FIG. 5 is a top view of the cable chain retraction system of FIG. 2, with a top portion of the cable chain guide removed for clarity.
Figure 6A:
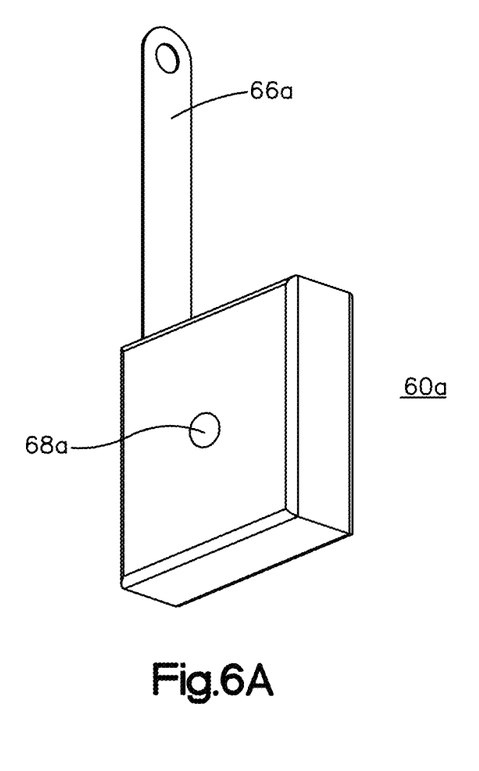
FIG. 6A is a first embodiment spring cartridge.
Figure 6B:
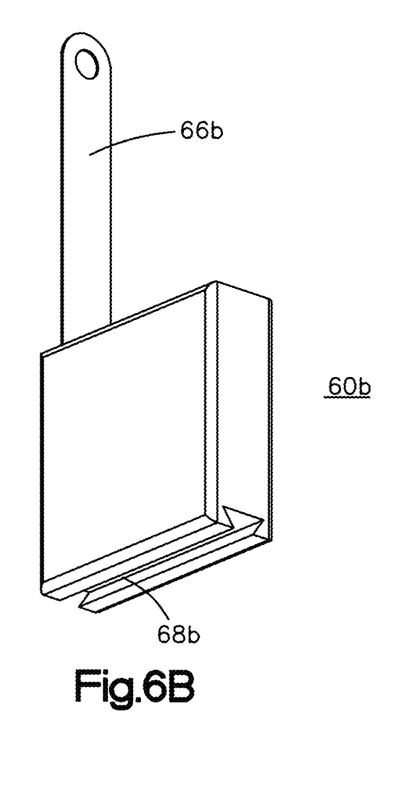
FIG. 6B is a second embodiment spring cartridge.

A constant force spring assembly 50 mounted on the back or retraction side of system 10 includes a mounting plate 52 and (preferably) pairs of spring cartridges 60. Each spring cartridge 60 includes a drum 62 and a ribbon-spring 64 that is wound around the drum 62. Ribbon 64 includes a tail 66 that extends from cartridge 60 toward carriage assembly 30 and attaches to bracket 38 of carriage 34. As illustrated in FIGS. 5 and 6A, 6B, tails 66 can include a through hole to attach to bracket 38 by a pin or other structure. Brackets 56a and 56b, which may be attached to mounting plate 52, to picatinny rail 12, or on a plate spanning the length of carriage assembly 30, receive and support guiderails 20a and 20b.

Cartridges 60 located on opposing sides of a longitudinal centerline CL are oppositely handed or wound such that tails 66 exit together to be joined together on bracket 38, preferably on centerline CL to the extent feasible. In this regard, cartridges 60 are back to back in that the tails 66 are close together for ease of connection to the carriage. Thus only one bracket or attachment point is required, although other configurations are contemplated. Bracket 38 is part of carriage 34, thus it is understood that tails 66 are attached to carriage 34.

The back-to-back configuration (that is, in which cartridges 60 are opposite hand and placed together such that the tails 66 of each bracket are close together or in contact) also solves a problem encountered by the inventor during development of system 10. In this regard, the wound or spiral configuration of ribbon 64 in some circumstances tends to cause or promote a bow or curvature of the tail 66. The back-to-back orientation of the cartridges 60 positions the bows in opposing directions and in this regard diminishes the magnitude of the bow in configurations in which the corresponding tails contact each other.

Figure 4:
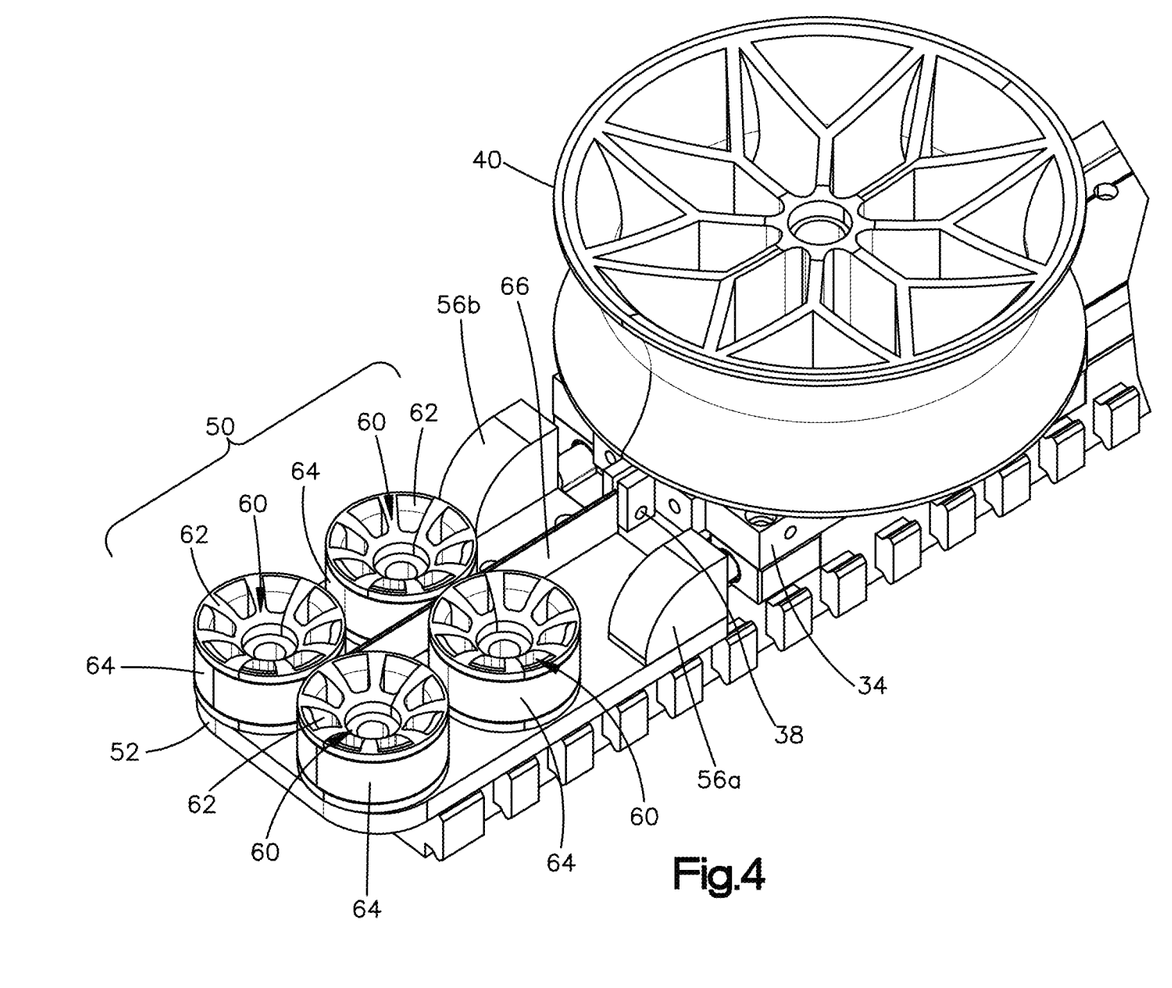
FIG. 4 is an enlarged view of a rear or spring portion of the cable chain retraction system of FIG. 2.

Further, the present invention encompasses multiple springs assembled together in a single cartridge, such as oriented in FIG. 4. Multiple springs within one cartridge may speed installation in some circumstances. Further, it is understood that cartridges can be configured with various pulling forces. For example, some cartridges may have a small pulling force for fine adjustment and other cartridges may have a large pulling force for course adjustment. In this regard, a low force spring cartridge may be added if only a small increase is needed, and a high spring force cartridge or a cartridge with multiple high force springs, or any other configuration may be employed in any combination as needed. The spring forces, of course, will vary according to the particular robot configuration and operation.

FIGS. 2 through 4 illustrate spring cartridge 60 without a housing for ease of illustration. FIGS. 6A and 6B illustrate two embodiments of the spring cartridge, including the housing, as preferred. First embodiment spring cartridge 60a has a housing having a through hole 68a that can attached to mounting plate 52 by a bolt, and can be oriented on mounting plate 52 such that spring ribbon 66a extends toward carriage assembly 30 at or along centerline CL. Second embodiment spring housing 60b includes an undercut or dovetail slot 68b that can attach to mounting plate 52 by sliding on a matching key or dovetail on plate 52 (not shown in the figures). The means for attaching the spring cartridges to the mounting plate are not limited to the embodiments of dovetails 68a and slots 68b. Rather, any attachment mechanism is contemplated.

In this regard, during set up or diagnosis or maintenance of a robot, such as robot 100, additional cartridges 60 can be added if it is determined to increase the retraction force. Mounting plate 52 may be replaced with a longer mounting plate if it is desired to have more spring cartridges than plate 52 can accept, or stronger spring cartridges 60 (that is producing enhanced retraction force) can replace weaker ones. The embodiment shows four cartridges 60, and it is understood that one, two, or three of the cartridges may be removed as desired to reduce the retraction force applied by spring assembly 50 to carriage body 34. It is also understood that spring cartridges 60 can be assembled in any configuration, such as stacked one on top of another, more than two abreast such that more attachment points are required, and any other configuration according to the particular parameters of the application.

In practice, to illustrate the operation of system 10, carriage body 34 can be at a midway point between its ends, as defined by the end or rails 20a and 20b, and at rest (that is, the spring biasing force of spring cartridges 60 counteracts the downward or outward force applied by or to cable chain 130 such that the forces on carriage 34 are in equilibrium). Then robot 120 can move such that arms 106 and 108 extend or move away from its base 102 or lower arm 106 in a way that puts cable chain 130 in tension. Because cable chain 130 is affixed to arm 108 at or near end effector 110, or affixed to end effector 110, a force is applied to cable chain 130 as the cable chain is extended. And because cable chain 130 is fixed at cable chain clamp 140, the force applied to chain 130 pulls cable chain 130 through guide 150, which pulls carriage body 34 forward (that is toward clamp 140 and guide 150) against the spring biasing force of spring cartridges 60. Thus, retraction system 10 provides additional cable chain 130 as needed to facilitate extension of robot arms 106 and 108.

In the opposite direction, arms 106 and 108 may move in a way that would bunch up or cause slack cable chain 130, thus relieving the tension force on the cable chain or putting the cable chain in compression. In response, the spring biasing force of cartridges 60 retract carriage assembly 30 to pull cable chain through guide 150 to relieve the slack. In this way, retraction system 10 takes up slack in cable chain 130.

To illustrate the controls system, the position and orientation of the end effector may be controlled through instructions from the control system. Specifically, the control system may receive input from a human operator and/or a grasp planning program so as to employ custom grasping strategies for various shapes of items. For example, in relation to suction-type end effectors, six-sided boxes with planar surfaces and no label may require only simple grasping strategies regardless of size and orientation. But items with more complex surfaces may be difficult to grasp, especially if these items are disposed in close proximity to other items and objects, such as when multiple items are disposed in a storage container such as a gaylord.

In some embodiments, the control system may receive data from one or more sensors (for example, optical, contact, proximity, etc.) disposed on and/or around the end effector. This data will be used by the control system to determine surface shapes of the item and objects near the item. Alternatively, or additionally, the control system may receive data from a database of known item types. For example, data of known item types may describe the item using two or higher dimensional images and/or modes of the item, attributes of the item (e.g., dimensions, weights, center of gravity, etc.), and/or features associated with surfaces of the item (e.g., a surface label, surface or material characteristics, etc.). A two dimensional image of the item showing a feature may allow an identification of a respective surface. If the two dimensional image (or a plurality thereof) shows multiple features, relative distances, positions, and orientations of these features may be determined. Generated two dimensional images of an item may be mapped to a multi-dimensional model that enables the control system to determine the relative position and orientation of the item in three-dimensional space. Alternatively, or additionally, the control system may receive data from one or more sensors (for example, optical, contact, proximity, etc.) in a scan tunnel disposed upstream of the end effector.

Alternatively, or additionally, the control system may receive data indicating grasping strategies that have been successful or unsuccessful for the same or similar items and/or item configurations in the past. Success data may be based on a specific end effector and/or a specific type of end effector and/or data related to the position and orientation of the end effector in relation to the items and item configurations. For example, the control system for the end effector may receive success data from the end effector itself, as well as other end effectors with the same or similar design. The known item data may also describe the applied manipulations (e.g., a list of the actions including grasping, moving, retrieving, etc.), related manipulation parameters (e.g., type and amount of force, pressure, voltage, and/or current applied, orientation of an item, etc.), and successes and failures of the applied manipulations (e.g., whether grasping an item was successful, damages resulting from using particular manipulations, end effectors, or forces, etc.).

The control system may receive input from a human and/or from one or more sensors regarding which, of two successful grasping strategies, is a better grasp. The control system may employ other data inputs, as well. The control system may employ machine learning on the received data to determine an initial grasping strategy. If unsuccessful, the control system may provide a second grasping strategy based, at least in part, on the data that the initial grasping strategy was unsuccessful. Once a successful grasping strategy is determined, the control system will save to the database data related to the successful strategy for future use by the specific end effector and other end effectors grasping the same or similarly shaped items.

In some embodiments, the robotic manipulation system is able to employ other end effectors having different structural profiles if the first grasping strategy using the first end effector is unsuccessful. The control system can receive success data regarding multiple end effectors, including input from a human and/or from one or more sensors (for example, optical, contact, proximity, etc.) regarding which, of two successful grasping strategies, is a better grasp. The control system will save to the database data related to strategies for grasping when multiple end effectors are available for future use by the specific end effector and other end effectors grasping the same or similarly shaped items.

Data used and gathered by the control system may be exchanged over one or more networks. The networks may include a public data network (e.g., the Internet) and a private data network (e.g., an intranet or a virtual private network (VPN)), wireless or wired, and implementing different communication protocols (e.g., TCP/IP). The network may connect to the specific robotic arm on which the end effector is disposed, as well as other robotic arms.

The present invention has been illustrated by describing a particular structure and function of a dresspack and cable retraction system. The present invention is not limited to the particular structure and function disclosed in the text and drawings. Rather it is intended that the scope of the invention be given the breadth as set out in the claims. Further, some problems or drawbacks of prior art devices have been explained to provide context, but the present invention is not limited to any structure and/or function that addresses or overcomes the prior art drawbacks, which are provided merely for illustration.

What is claimed:

1. A cable retraction system, comprising:
   at least one guiderail extending along a longitudinal axis;
   a carriage configured to longitudinally move on the at least one guiderail;
   a guidewheel rotationally mounted on the carriage and adapted to move with the carriage;
   a spring cartridge including a ribbon that is adapted for pulling the carriage toward a retracted position, thereby removing slack from a cable looped around the guidewheel; and
   a body adapted for receiving a plurality of the spring cartridges,
   wherein the spring cartridge maintains a substantially constant retraction force on the carriage regardless of the longitudinal position of the carriage.

2. The retraction system of claim 1, wherein the spring cartridge has a ribbon outlet that is proximate a longitudinal centerline of the carriage.

3. The retraction system of claim 1, wherein the spring cartridge is multiple pairs of spring cartridges located back-to-back about a longitudinal centerline of the carriage.

4. The retraction system of claim 1, wherein the ribbon is attached to the carriage.

5. The retraction system of claim 1, wherein the carriage is mounted on the at least one guiderail by bearing means.

6. The retraction system of claim 1, wherein the at least one guiderail is a pair of parallel guiderails.

7. The retraction system of claim 1, further comprising a quick release guiderail, wherein the body and the at least one guiderail are mounted on the quick release guiderail.

8. A dresspack configured to be mounted to a robot including a manipulatable arm, the dresspack comprising:
   a cable retraction system including:
      at least one guiderail extending along a longitudinal axis;
      a carriage configured to move along the at least one guiderail along the longitudinal axis;
      a guidewheel rotationally mounted on the carriage and adapted to move with the carriage;
      a spring cartridge including a ribbon that is adapted for pulling the carriage toward a retracted position; and
      a body adapted for receiving a plurality of the spring cartridges;
   a cable looped around the guidewheel of the retraction system; and
   a cable guide adapted for guiding the cable to translate therethrough upon longitudinal movement of the carriage,
   wherein the cable retraction system maintains a substantially constant retraction force on the cable regardless of the position of the manipulatable arm of the robot and regardless of the longitudinal position of the carriage.

9. The dresspack of claim 8, further comprising a cable clamp affixing the cable thereto.

10. The dresspack of claim 9, wherein the cable clamp is located on one side of the longitudinal axis and the cable guide is located on an opposing side of the longitudinal axis, the cable extending between the cable clamp and the cable guide to loop around the guidewheel.

11. The dresspack of claim 8, wherein the spring cartridge is multiple pairs of spring cartridges located back-to-back about a longitudinal centerline of the carriage.

12. The dresspack of claim 8, wherein the ribbon is attached to the carriage.

13. The dresspack of claim 8, wherein the carriage is mounted on the at least one guiderail by bearing means.

14. The dresspack of claim 8, further comprising a quick release guiderail, wherein the body, the at least one guiderail and the cable guide are mounted on the quick release guiderail.

15. A method for providing constant-force retraction of a cable using the dresspack of claim 9, the method comprising:
   clamping the cable to the cable clamp proximate the manipulatable arm of the robot;
   guiding the cable via the cable guide located proximate the cable clamp;
   manipulating the robot manipulatable arm causing the cable to translate through the cable guide; and
   retracting slack in the cable by applying a constant retraction force to a loop of the cable formed between the cable clamp and the cable guide.

16. The method of claim 15, wherein retracting the slack includes applying the constant retraction force using the spring cartridge.

17. The method of claim 16, further comprising adding or subtracting spring cartridges to adjust the retraction force.

18. The method of claim 15, further comprising installing the rolled cartridge, the carriage, and the cable via a pre-assembled common rail.

19. The retraction system of claim 1, wherein the cable is a cable.

20. The dresspack of claim 8, wherein the spring cartridge has a ribbon outlet that is proximate a longitudinal centerline of the carriage.

* * * * *